(12) United States Patent
Liu et al.

(10) Patent No.: US 11,810,320 B2
(45) Date of Patent: Nov. 7, 2023

(54) METHOD AND APPARATUS FOR DETERMINING LOCATION OF SIGNAL LIGHT, STORAGE MEDIUM, PROGRAM AND ROADSIDE DEVICE

(71) Applicant: Apollo Intelligent Connectivity (Beijing) Technology Co., Ltd., Beijing (CN)

(72) Inventors: Bo Liu, Beijing (CN); Leping Huang, Beijing (CN)

(73) Assignee: Apollo Intelligent Connectivity (Beijing) Technology Co., Ltd., Beijing (CN)

( * ) Notice: Subject to any disclaimer, the term of this patent is extended or adjusted under 35 U.S.C. 154(b) by 69 days.

(21) Appl. No.: 17/366,604

(22) Filed: Jul. 2, 2021

(65) Prior Publication Data

US 2021/0334980 A1   Oct. 28, 2021

(30) Foreign Application Priority Data

Dec. 28, 2020   (CN) .......................... 202011588838.9

(51) Int. Cl.
*G06T 7/73* (2017.01)
*G06T 7/62* (2017.01)
(Continued)

(52) U.S. Cl.
CPC .............. *G06T 7/73* (2017.01); *G06T 7/0002* (2013.01); *G06T 7/13* (2017.01); *G06T 7/62* (2017.01);
(Continued)

(58) Field of Classification Search
CPC .... G06T 7/12; G06T 7/13; G06T 9/20; G06T 7/10; G06T 7/70; G06T 7/73;
(Continued)

(56) References Cited

U.S. PATENT DOCUMENTS 11,501,512 B2 * 11/2022 Ito .......................... H04N 19/132
2018/0197026 A1 * 7/2018 Oki ........................ G06V 20/584
(Continued)

FOREIGN PATENT DOCUMENTS

CN   103679733 A      3/2014
CN   107730481 A *   2/2018 ............... G06T 5/50
(Continued)

OTHER PUBLICATIONS

Office Action of corresponding Japanese Application No. 2021210160, dated Oct. 31, 2022, 6 pages.
(Continued)

*Primary Examiner* — Ian L Lemieux
*Assistant Examiner* — Woo C Rhim
(74) *Attorney, Agent, or Firm* — Tucker Ellis LLP (57) ABSTRACT

A method and apparatus for determining a location of a signal light, a storage medium, a program and a roadside device provided by the present application, which relate to intelligent traffic technology and automatic driving technology, including: for a plurality of frames of images captured including the signal light, determining horizontal edges and vertical edges in each of the images; combining, according to the obtained horizontal edges and vertical edges, to obtain a plurality of rectangular frames; and determining, according to the plurality of rectangular frames and preset size information of a frame of the signal light, the location of the signal light in the image.

15 Claims, 6 Drawing Sheets

(51) Int. Cl.
*G06T 7/13* (2017.01)
*G06T 7/00* (2017.01)
*G06V 10/25* (2022.01)
*G06V 10/56* (2022.01)
*G06V 10/44* (2022.01)
*G06V 20/58* (2022.01)

(52) U.S. Cl.
CPC .............. *G06V 10/25* (2022.01); *G06V 10/44* (2022.01); *G06V 10/56* (2022.01); *G06V 20/584* (2022.01)

(58) Field of Classification Search
CPC .. G06V 10/44; G06V 10/255; G06V 2201/07; G06V 10/25; G06V 20/584; G06V 20/58
See application file for complete search history.

(56) References Cited

U.S. PATENT DOCUMENTS

| | | | | |
|---|---|---|---|---|
| 2019/0087961 A1* | 3/2019 | Tian | ........................ | B60T 7/12 |
| 2020/0202157 A1* | 6/2020 | Ito | ........................ | H04N 19/132 |

FOREIGN PATENT DOCUMENTS

| | | | | | |
|---|---|---|---|---|---|
| CN | 107730481 | A | | 2/2018 | |
| CN | 109035198 | A | * | 12/2018 | |
| CN | 109035198 | A | | 12/2018 | |
| CN | 111639656 | A | * | 9/2020 | |
| CN | 111639656 | A | | 9/2020 | |
| CN | 111931726 | A | * | 11/2020 | ......... G06K 9/00697 |
| CN | 112101223 | A | | 12/2020 | |
| JP | 2019053619 | A | * | 4/2019 | ............... B60T 7/12 |
| JP | 2019053619 | A | | 4/2019 | |
| JP | 2020102773 | A | | 7/2020 | |
| KR | 101877809 | B1 | * | 7/2018 | |
| KR | 101877809 | B1 | | 7/2018 | |
| WO | 2010115020 | A2 | | 10/2010 | |
| WO | WO-2010115020 | A2 | * | 10/2010 | ............... G01J 3/46 |

OTHER PUBLICATIONS

European Search Report dated Dec. 3, 2021 for Application Serial No. EP21183669.7.
Wang, et al. "A Real-Time Architecture of Multiple Features Extraction for Vehicle Verification," Department of Electrical Engineering, National Chung Hsing University, 2014.
Office Action of corresponding Chinese Application No. 202011588838.9, dated Sep. 23, 2023, 13 pages.
Margrit Betke et al., "Multiple Vehicle Detection and Tracking in Hard Real-Time", University of Maryland Institute for Advanced Computer Studies, dated Aug. 6, 2002, 6 pages.

* cited by examiner

METHOD AND APPARATUS FOR DETERMINING LOCATION OF SIGNAL LIGHT, STORAGE MEDIUM, PROGRAM AND ROADSIDE DEVICE

CROSS-REFERENCE TO RELATED APPLICATIONS

This application claims priority to Chinese Patent Application No. 202011588838.9, filed on Dec. 28, 2020, which is hereby incorporated by reference in its entirety.

TECHNICAL FIELD

The present application relates to intelligent traffic technology and automatic driving technology in image processing technology, and in particular, to a method and apparatus for determining a location of a signal light, a storage medium, a program and a roadside device.

BACKGROUND

A signal light can be seen everywhere in life, and the signal light includes a plurality of light sockets. For example, a traffic light includes three light sockets.

In some application scenarios, it is necessary to collect state information of the signal light, such as a color of the signal light. In an implementation, an image including the signal light can be captured, and then a state of the signal light can be determined according to the captured image.

When the state of the signal light is determined based on the image, a location of the signal light in the image needs to be determined in advance, and then recognition is carried out. But in an actual process, whether thermal expansion and cold contraction of an erection device, or aging and loosening of installation components, will lead to a slightly motivation of an image capturing apparatus, and then a complete signal light cannot be acquired according to a predetermined location, and an accurate state of the signal light cannot be obtained.

SUMMARY

The present application provides a method and apparatus for determining a location of a signal light, a storage medium, a program and a roadside device for determining the location of the signal light according to captured images including the signal light.

According to a first aspect of the present application, a method for determining a location of a signal light is provided, including:

for a plurality of frames of images captured including the signal light, determining horizontal edges and vertical edges in each of the images;

combining, according to the obtained horizontal edges and vertical edges, to obtain a plurality of rectangular frames; and determining, according to the plurality of rectangular frames and preset size information of a frame of the signal light, the location of the signal light in the image.

According to a second aspect of the present application, an apparatus for determining a location of a signal light is provided, including:

an edge detecting unit, configured to: for a plurality of frames of images captured including the signal light, determine horizontal edges and vertical edges in each of the images;

a combining unit, configured to combine, according to the obtained horizontal edges and vertical edges, to obtain a plurality of rectangular frames; and a location determining unit, configured to determine, according to the plurality of rectangular frames and preset size information of a frame of the signal light, the location of the signal light in the image.

According to a third aspect of the present application, an electronic device is provided, including:

at least one processor; and a memory in communicational connection with the at least one processor; where, the memory stores instructions executable by the at least one processor, the instructions are executed by the at least one processor to enable the at least one processor to execute the method for determining the location of the signal light as described in the first aspect.

According to a fourth aspect of the present application, a non-transitory computer-readable storage medium storing computer instructions is provided, where the computer instructions are used to cause the computer to execute the method for determining the location of the signal light as described in the first aspect.

According to a fifth aspect of the present application, a computer program product is provided, including a computer program, which when executed by a processor, implements the method for determining the location of the signal light as described in the first aspect.

According to a sixth aspect of the present application, a roadside device is provided, including an electronic device as shown in the third aspect.

The method and apparatus for determining a location of a signal light, the storage medium, the program and the roadside device are provided by the present application, including: for a plurality of frames of images captured including the signal light, determining horizontal edges and vertical edges in each of the images; combining, according to the obtained horizontal edges and vertical edges, to obtain a plurality of rectangular frames; and determining, according to the plurality of rectangular frames and preset size information of a frame of the signal light, the location of the signal light in the image. In this implementation, the location of the signal light can be determined by recognizing an edge in the image, so as to avoid a failure to obtain a complete signal light based on preset labeling information due to change of the location of the image capturing apparatus or the signal light. Moreover, the solution provided by the present application can be realized simply by recognizing the edge in the image, which is less time-consuming and requires less computing power.

It should be understood that the contents described in this part are not intended to identify key or important features of the embodiments of the present application, nor are they intended to limit the scope of the present application. Other features of the present application will be easily understood by the following description.

BRIEF DESCRIPTION OF DRAWINGS

The accompanying drawings are used to better understand solutions, but do not limit the present application. In the accompanying drawings.

DESCRIPTION OF EMBODIMENTS

The following describes exemplary embodiments of the present application in combination with the accompanying drawings, in which various details of the embodiments of the present application are included to facilitate understanding, and they shall be considered as merely exemplary. Therefore, those skilled in the art should realize that various changes and modifications can be made to the embodiments described herein without departing from the scope and spirit of the present application. Similarly, for the sake of clarity and conciseness, the description of well-known functions and structures is omitted in the following.

There are signal lights in many application scenarios, and the signal lights can play a guiding role. In some embodiments, state information of a signal light needs to be collected, for example, light color of the signal light needs to be identified, so as to realize a guidance function more easily. For example, in the field of intelligent traffic, by identifying the light color of the signal light, services such as detection of running a red light can be performed, and a current state of the signal light can also be broadcasted to distant vehicles so that these vehicles can plan their routes in advance.

However, when determining a state of the signal light based on an image, it is necessary to determine a location of the signal light in the image in advance, and then recognize it. During this recognition process, if an erection device thermal expands and cold contracts, or installation components are aging and loosing, the image capturing apparatus will move, which will lead to a failure to acquire a complete signal light in the captured image based on a pre-calibrated location, and then an accurate state of the signal light cannot be obtained.

In one implementation, an image capturing apparatus can be set near a signal light to capture the image of the signal light by using the image capturing apparatus. The image capturing apparatus can be a camera, and continuous images including the signal light can be captured by the camera.

Furthermore, the image capturing apparatus can send a captured image to a server for collecting the state of the signal light. Based on demand, an electronic device may perform processing according to the received image.

Figure 1A:
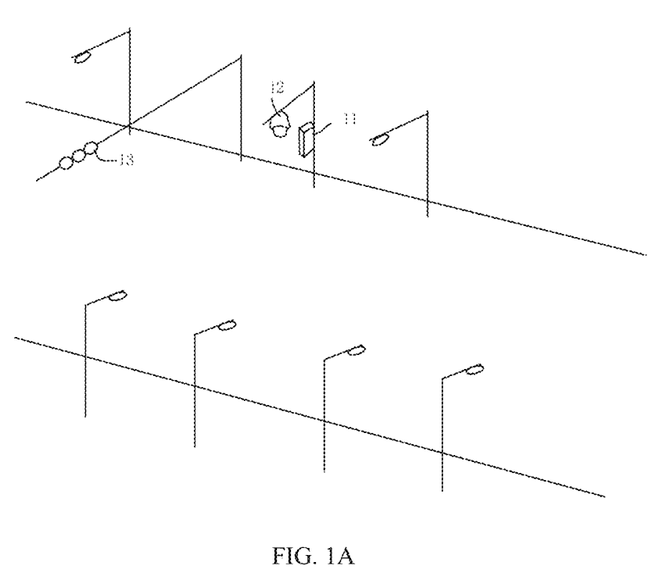
FIG. 1A is an application scenario diagram shown in an exemplary embodiment of the present application.

FIG. 1A is an application scenario diagram shown in another exemplary embodiment of the present application.

As shown in FIG. 1A, a roadside device 11 can be set beside a road, the roadside device 11 is connected with an image capturing apparatus 12, and the image capturing apparatus 12 can capture an image of a signal light 13.

Figure 1B:
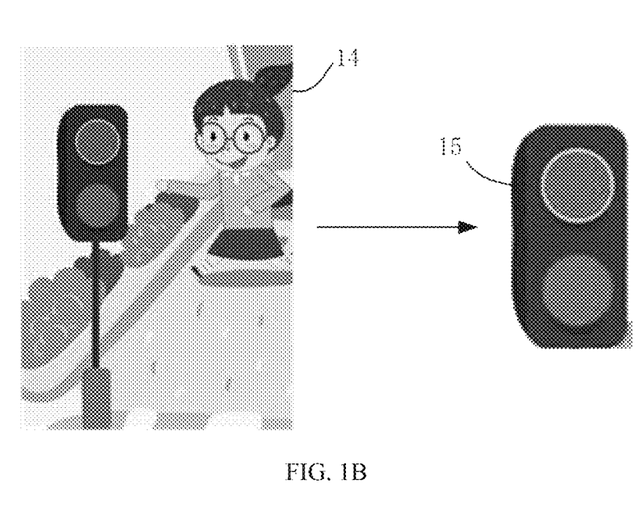
FIG. 1B is a schematic diagram of an image captured by an image capturing apparatus shown in an exemplary embodiment of the present application.

FIG. 1B is a schematic diagram of an image captured by an image capturing apparatus shown in an exemplary embodiment of the present application.

The image capturing apparatus 12 can acquire an image as shown in 14 in FIG. 1B and send the image 14 to the roadside device 11 or the server.

An area where the signal light is located can be labeled in advance, and the roadside device 11 or the server can cut the received image 14 according to a location of the signal light labeled in advance to obtain an image only including the signal light as shown in 15, and performs processing to the cut image based on demand.

However, if a relative location of the image capturing apparatus and the signal light is offset, then it will not be impossible to cut out a complete image of the signal light from the image using a preset labeled location of the signal light.

The present application provides a method and apparatus for determining a location of a signal light, a storage medium, a program and a roadside device, which is applied to intelligent traffic technology and automatic driving technology in image processing technology, and is used to determine a location of a signal light according to a captured image including the signal light.

Figure 2:
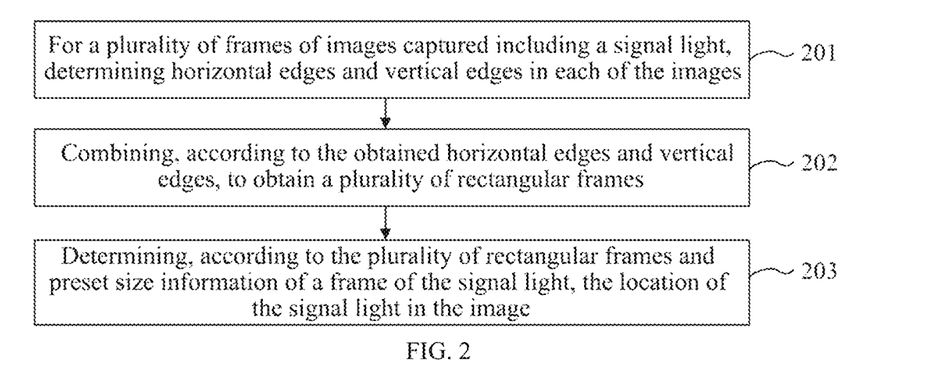
FIG. 2 is a flow diagram of a method for determining a location of a signal light shown in an exemplary embodiment of the present application.

FIG. 2 is a flow diagram of a method for determining a location of a signal light shown in an exemplary embodiment of the present application.

As shown in FIG. 2, the method for determining the location of the signal light shown in an exemplary embodiment of the present application includes:

Step 201, for a plurality of frames of images captured including the signal light, determining horizontal edges and vertical edges in each of the images.

The method provided by the present application can be executed by an electronic device with computing capability, which can receive an image including the signal light captured by an image capturing apparatus.

The electronic device can also process the received image based on demand, for example, it can implement the solution of identifying a state of the signal light or extracting a light color of the signal light.

Specifically, when the electronic device processes the received image, it can extract the signal light included in the image based on pre-calibrated location information, and then recognize the signal light. If the location of the image capturing apparatus is offset, or a device for setting the signal light is offset, a complete signal light cannot be extracted based on the pre-calibrated location information.

Furthermore, when processing based on the captured images, the electronic device can further determine the location of the signal light in the image according to these images.

In a practical application, the electronic device can process a plurality of frames of images captured which include the signal light. For example, the number of images can be set as n, and the continuous n frames of images captured can be processed.

Each time the electronic device receives a frame of image, it can determine horizontal edges and vertical edges in the image. The electronic device can also store the determined horizontal edges and vertical edges in a preset list. For example, an edge list can be set in advance, in which the horizontal edge and the vertical edge corresponding to each frame of image can be stored.

Specifically, the horizontal edge and the vertical edge can be recorded by means of coordinates. For example, an image identification P1 is recorded in the list, and a corresponding horizontal edge [(x1, y), (x2, y)], and a corresponding vertical edge [(x, y1), (x, y2)] of P1 can also be recorded, where x1, x2, y, x, y1, y2 can be pixel coordinate values in the image.

Figure 3A:
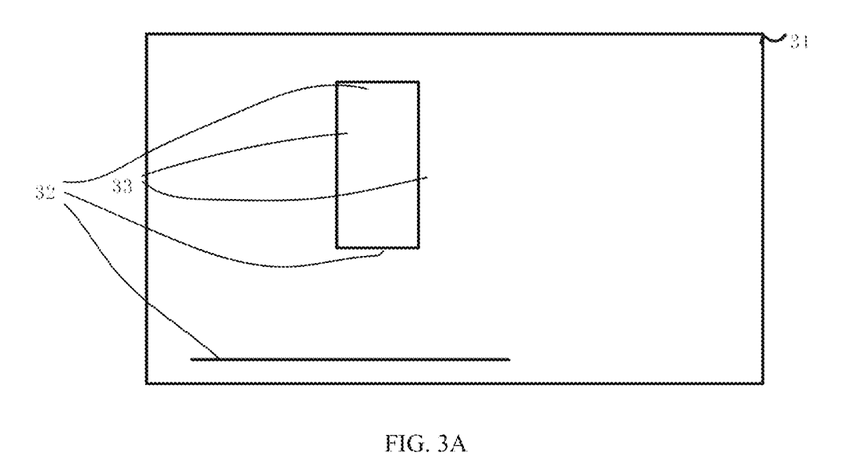
FIG. 3A is a schematic diagram of an edge detection result shown in an exemplary embodiment of the present application.

FIG. 3A is a schematic diagram of an edge detection result shown in an exemplary embodiment of the present application.

As shown in FIG. 3A, three horizontal edges 32 and two vertical edges 33 can be recognized in one frame of image 31. In other frames of images, horizontal edges and vertical edges can also be recognized.

Furthermore, the electronic device can use a Sobel operator to determine the horizontal edge and the vertical edge in the image. The determined horizontal edge refers to an edge parallel to a frame in a horizontal direction of the signal light in the image, and the vertical edge refers to an edge parallel to a frame in a vertical direction of the signal light in the image.

In a practical application, the Sobel operator is an important processing method in the field of computer vision. It is mainly used to obtain a first-order gradient of a digital image, and a common application and physical meaning is edge detection. The Sobel operator is to weigh gray values of each pixel in four fields of up, down, left, and right of the image, and reach an extreme value at the edge to detect the edge.

Because a frame of the signal light is rectangular, a location of a frame that meets a style of the signal light can be determined in a frame of image by using the Sobel operator for edge recognition.

In a practical application, if the number of processed image frames reaches a preset number of frames, step 202 can be executed; otherwise, step 201 is continued to be executed for the received image frames. For example, the preset number of frames is n, and when a center of the n frames of images is obtained, step 202 can be executed.

Step 202, combining, according to the obtained horizontal edges and vertical edges, to obtain a plurality of rectangular frames.

The electronic device can combine each of the horizontal edges and vertical edges to get a plurality of rectangles.

In one implementation, the electronic device can combine the horizontal edges and vertical edges recognized in the plurality of images to obtain the plurality of rectangles. For example, in the edge list, two horizontal edges and two vertical edges can be extracted, and the extracted edges can be combined to obtain a rectangle.

In another implementation, the plurality of rectangles can be obtained by combining the horizontal edges and vertical edges belonging to one frame of image.

Figure 3B:
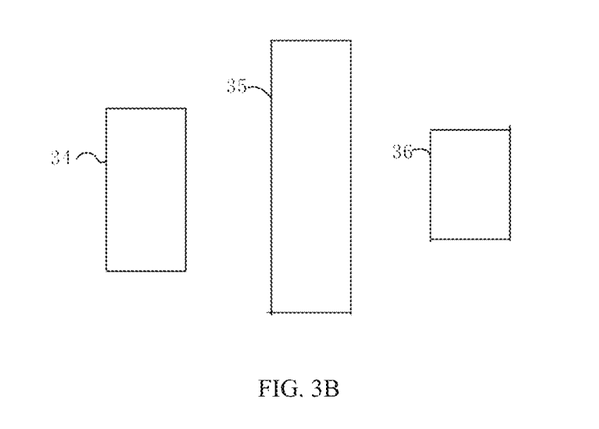
FIG. 3B is a schematic diagram of an edge detection result shown in an exemplary embodiment of the present application.

FIG. 3B is a schematic diagram of an edge detection result shown in an exemplary embodiment of the present application.

As shown in FIG. 3B, it is assumed that the horizontal edges and vertical edges determined in FIG. 3A are combined to obtain rectangular frames as 34, 35 and 36 shown.

In a practical application, the frame of the signal light is a rectangular frame, and four corners of the rectangular frame can be rectangular or arc-shaped. Therefore, the frame of the signal light is included in the rectangles which are obtained by recognizing the edges in the captured image and combining the edges. Therefore, the location of the signal light can be determined according to the rectangular frames obtained in the combination.

Step 203, determining, according to the plurality of rectangular frames and preset size information of a frame of the signal light, the location of the signal light in the image.

In the plurality of rectangular frames obtained by the combination, there may be a rectangular frame other than the frame of the signal light. Therefore, the rectangular frames can be screened first to get a rectangular frame that meets the frame of the signal light.

Specifically, the size information of the frame of the signal light can be set in advance, and the electronic device can acquire the preset size information of the frame of the signal light, and screen the rectangular frames according to the size of the frame of the signal light. For example, a rectangular frame with a size similar to that of the signal light can be taken as a target rectangular frame.

Specifically, when the electronic device recognizes an edge of the same rectangular frame in different images, the recognized locations may also be different, and the target rectangular frames are locations of the frame of the signal light determined in different images. Therefore, the location of the signal light in the image can be determined according to these target rectangular frames.

Furthermore, the location of the signal light in the image can be determined according to screened target rectangular frames. For example, an average location of the target rectangular frames can be calculated as the location of the signal light in the image.

The present application provides a method for determining a location of a signal light, including: for a plurality of frames of images captured including the signal light, determining horizontal edges and vertical edges in each of the images; combining, according to the obtained horizontal edges and vertical edges, to obtain a plurality of rectangular frames; and determining, according to the plurality of rectangular frames and preset size information of a frame of the signal light, the location of the signal light in the image. In this implementation, the location of the signal light can be determined by recognizing an edge in the image, so as to avoid a failure to obtain a complete signal light based on preset labeling information due to change of the location of the image capturing apparatus or the signal light. Moreover, the solution provided by the present application can be realized simply by recognizing the edge in the image, which is less time-consuming and requires less computing power.

Figure 4:
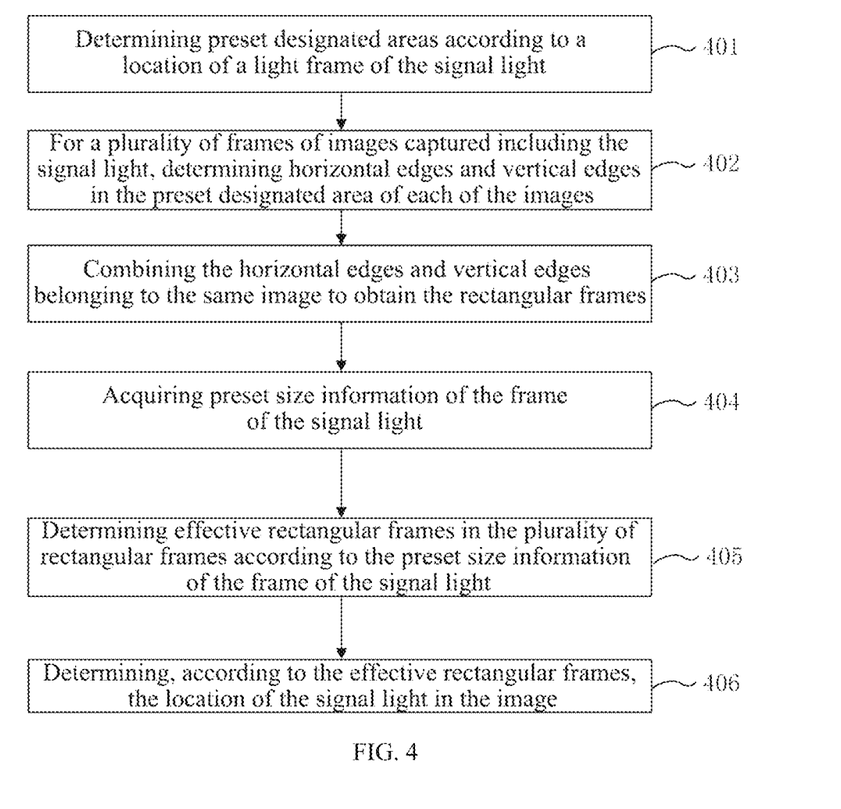
FIG. 4 is a flow diagram of a method for determining a location of a signal light shown in another exemplary embodiment of the present application.

FIG. 4 is a flow diagram of a method for determining a location of a signal light shown in another exemplary embodiment of the present application.

As shown in FIG. 4, the method for determining the location of the signal light shown in an exemplary embodiment of the present application includes:

Step 401, determining preset designated areas according to a location of a light frame of the signal light.

The method provided by the present application can be executed by an electronic device with computing capabilities, which can receive an image including the signal light captured by an image capturing apparatus.

The electronic device can also process the received image based on the demand, for example, it can implement the solution of identifying a state of the signal light or extracting a color of the signal light.

Specifically, in the method provided by the application, a location of a light frame of the signal light is labeled in a history image in advance. For example, a history image including the signal light can be captured by the image capturing apparatus, and a user can label the light frame of the signal light in the history image. If the locations of the image capturing apparatus and the signal light remain unchanged, then the signal light can be cut out from other images captured by the image capturing apparatus based on the location of the light frame of the signal light.

Furthermore, if a relative location of the image capturing apparatus and a traffic light changes due to the reasons of thermal expansion and cold contraction or bolt loosening, the electronic device cannot cut out a complete signal light from the captured images according to the pre-labeled location of the light frame of the signal light.

Therefore, in the method provided by the present application, the electronic device can determine the preset designated areas in the plurality of frames of images captured including the signal light according to the location of the light frame of the signal light. Specifically, based on the location of the light frame of the signal light, expansion can be done in each of up, down, left and right directions to get the preset designated areas.

Figure 5A:
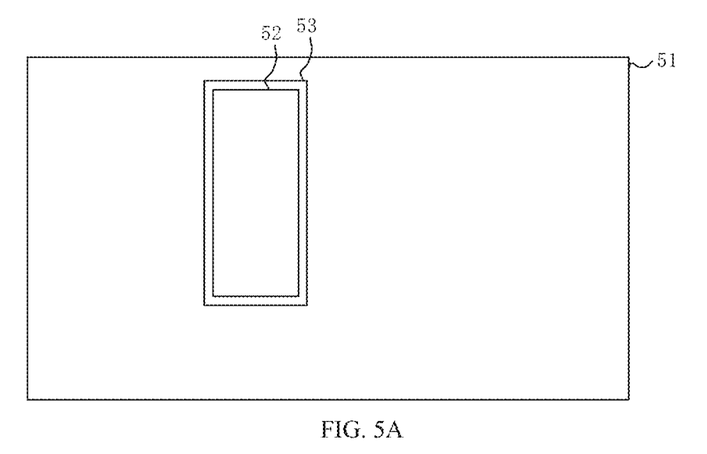
FIG. 5A is a schematic diagram of determining a preset designated area shown in an exemplary embodiment of the present application.

FIG. 5A is a schematic diagram of determining a preset designated area shown in an exemplary embodiment of the present application.

As shown in FIG. 5A, a pre-labeled location of a light frame of the signal light 52 can be determined in an image 51, and the electronic device can expand the location of the light frame 52 to obtain a preset designated area 53.

Step 402, for a plurality of frames of images captured including the signal light, determining horizontal edges and vertical edges in the preset designated area of each of the images.

When the electronic device processes a captured image, the horizontal edges and vertical edges can be determined in the preset designated area of each of the images.

In this implementation, a size of an image to be processed by the electronic device can be reduced, thereby reducing an amount of data processing of the electronic device. Furthermore, this implementation can further avoid an influence of an edge existing in the area except the signal light in the image on a recognition result.

In a practical application, a specific method of determining the edge in the preset designated area is similar to step 201 and will not be repeated.

Edge detection on each of the images can be performed based on a Sobel operator to obtain the horizontal edges and vertical edges in each of the images.

The Sobel operator is an important processing method in the field of computer vision. It is mainly used to obtain a first-order gradient of a digital image, and a common application and physical meaning is edge detection. The Sobel operator is to weigh gray values of each pixel in four fields of up, down, left, and right of the image, and reach an extreme value at the edge to detect the edge.

Because a frame of the signal light is rectangular, a location of a frame that meets a style of the signal light can be determined in a frame of image by using the Sobel operator for edge recognition.

Step 403, combining the horizontal edges and vertical edges belonging to the same image to obtain the rectangular frames.

The electronic device can combine the horizontal edges and vertical edges recognized from the same image, so as to determine a possible frame of the signal light in the same image.

Specifically, combining the horizontal edges and vertical edges of the same image can reduce the number of rectangular frames obtained by the combination, thus reducing the amount of data processing. Furthermore, four edges of the frame of the signal light will appear in the same image, therefore, a rectangular frame that is consistent with the frame of the signal light can be screened out from the rectangular frames in one frame of image.

Step 404, acquiring preset size information of the frame of the signal light.

Furthermore, the size information of the frame of the signal light can be set in advance. For example, a size of the signal light can be written into the electronic device in advance, so that the electronic device can obtain the size information of the frame of the signal light when determining an effective rectangular frame.

The preset size information of the frame of the signal light can be actual size information of the signal light.

In an optional implementation, a location of a light frame of the signal light can be labeled in the history image in advance, and the electronic device can determine the size information of the light frame of the signal light according to the location of the frame of the signal light.

In this implementation, the electronic device does not need to store the size information of the frame of the signal light, but only needs to determine the size information by using the pre-labeled location of the light frame of the signal light when acquiring the size information of the frame of the signal light, thereby saving storage space.

Step 405, determining effective rectangular frames in the plurality of rectangular frames according to the preset size information of the frame of the signal light.

In a practical application, the electronic device can screen the plurality of rectangular frames according to the preset size information of the frame of the signal light to get the effective rectangular frames.

A rectangular frame whose size conforms to the preset size information of the frame of the signal light can be regarded as an effective rectangular frame in the plurality of rectangular frames. For example, a rectangular frame whose length and width are similar to the preset size information of the frame of the signal light is determined as an effective rectangular frame.

In this implementation, the electronic device can screen out the effective rectangular frame according to an actual size of the signal light, so as to determine accurate location of the signal light according to the effective rectangular frame.

In one implementation, the preset size information of the frame of the signal light includes any two of following parameters: a height value, a width value and a height width ratio. The electronic device can screen out the effective rectangular frame based on these parameters.

Specifically, an effective rectangular frame whose size meets any two parameters of the height value, the width value and the height width ratio in the preset size information of the frame of the signal light can be screened out from the plurality of rectangular frames. For example, if there is a rectangular frame whose height conforms to the height value in the parameter, and a height width ratio of the rectangular frame also conforms to the height width ratio in the parameter, then the rectangular frame can be considered as an effective rectangular frame.

Furthermore, the effective rectangular frame can be obtained by screening using the plurality of parameters, in this way, the effective rectangular frame whose size is consistent with the actual size of the signal light can be screened out.

Step 406, determining, according to the effective rectangular frames, the location of the signal light in the image.

Specifically, the location of the signal light can be determined according to the effective rectangular frames that have been screened out. For example, an average location of the effective rectangular frames can be determined as the location of the signal light. For example, there are three effective rectangular frames whose upper left corner locations are p1, p2 and p3 respectively, and an average value of these three corner locations can be calculated as a location of an upper left corner of the signal light.

Furthermore, when determining the location of the signal light according to the effective rectangular frames, the electronic device can further screen the effective rectangular frames to get the target rectangular frames.

In a practical application, the electronic device can determine center points of the effective rectangular frames, and determine the target rectangular frames in the plurality of effective rectangular frames according to the center points. If the locations of the effective rectangular frames all conform to the location of the signal light, then locations of the center points of the effective rectangular frames should also be close. Therefore, the effective rectangular frames can be further screened according to the center points of the effective rectangular frames.

The electronic device can determine the location of the signal light in the image according to the target rectangular frames. Since the target rectangular frames are preliminarily screened according to the size of the signal light, and then screened again according to the locations of the effective rectangular frames, therefore, the location of the signal light determined according to the target rectangular frames is more accurate.

Specifically, the electronic device can process the center points based on a random sample consensus (RANSAC) algorithm to determine target center points.

Specifically, RANSAC can estimate parameters of a mathematical model in an iterative manner from a set of observation data containing "outliers". Outliers are points that do not fit the model.

If the location of the effective rectangular frame conforms to the location of the signal light, the location of the center point of the effective rectangular frame should also be close, which thus meets the mathematical model. Therefore, based on RANSAC, the center points can be filtered to find the target center points which are close to each other.

Furthermore, RANSAC can select a set of subsets from determined center points and assume that the subsets are inliers. Current inliers can be used to estimate a model, and the model is used to test other center points except inliers. If a center point is suitable for the model, it is considered that the center point is also an inlier. If enough center points are classified as assumed inliers, then the estimated model can be considered as accurate, and these center points classified as inliers can be determined as the target center points.

In a practical application, an effective rectangular frame corresponding to the target center point can be determined as the target rectangular frame. Locations of these target center points are close, so it can be considered that the target rectangular frame is the location of the frame of the signal light recognized by the electronic device in the image.

Figure 5B:
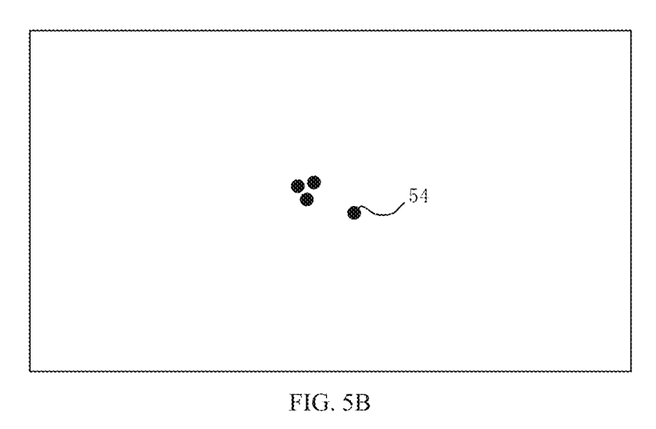
FIG. 5B is a schematic diagram of screening center points shown in an exemplary embodiment of the present application.

FIG. 5B is a schematic diagram of screening a center point shown in an exemplary embodiment of the present application.

As shown in FIG. 5B, a plurality of center points can be determined according to the determined effective rectangular frames, and the center points can be screened based on the RANSAC algorithm. For example, a center point 54 is not suitable for the estimated model, so the center point 54 can be filtered out, and the remaining center points are the target center points.

In this implementation, target center points whose locations are gathered together can be filtered out through RANSAC, so as to avoid other effective rectangular frames that are inconsistent with the location of the target rectangular frame, which may affect a determination result of the location of the signal light.

The electronic device can determine the average location according to the locations of the target rectangular frames, and then get the location of the signal light in the image. The target rectangular frames determined in this implementation are rectangular frames which conform to the location of the signal light identified in different frames of images. Therefore, the average location of the determined target rectangular frame is the accurate location of the signal light in the image.

Figure 6:
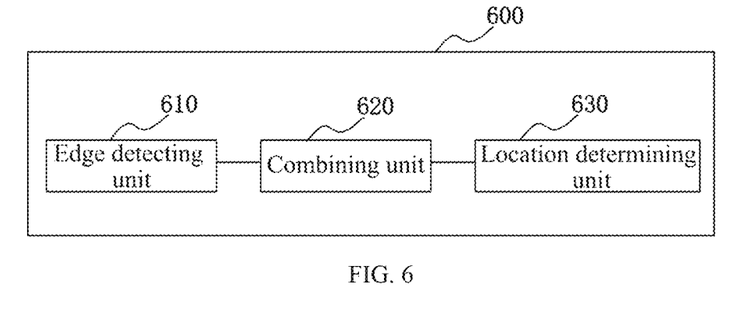
FIG. 6 is a structural diagram of an apparatus for determining a location of a signal light shown in an exemplary embodiment of the present application.

FIG. 6 is a structural diagram of an apparatus for determining a location of a signal light shown in an exemplary embodiment of the present application.

As shown in FIG. 6, an apparatus for determining a location of a signal light 600 provided by the present application includes:

an edge detecting unit 610, configured to: for a plurality of frames of images captured including the signal light, determine horizontal edges and vertical edges in each of the images;

a combining unit 620, configured to combine, according to the obtained horizontal edges and vertical edges, to obtain a plurality of rectangular frames; and a location determining unit 630, configured to determine, according to the plurality of rectangular frames and preset size information of a frame of the signal light, the location of the signal light in the image.

The apparatus for determining the location of the signal light provided by the present application includes an edge detecting unit, configured to: for a plurality of frames of images captured including the signal light, determine horizontal edges and vertical edges in each of the images; a combining unit, configured to combine, according to the obtained horizontal edges and vertical edges, to obtain a plurality of rectangular frames; and a location determining unit, configured to determine, according to the plurality of rectangular frames and preset size information of a frame of the signal light, the location of the signal light in the image. The apparatus provided in the present application can determine the location of the signal light by recognizing an edge in the image, so as to avoid a failure to obtain a complete signal light based on preset labeling information due to change of the location of the image capturing apparatus or the signal light. Moreover, the solution provided by the present application can be realized simply by recognizing the edge in the image, which is less time-consuming and requires less computing power.

Figure 7:
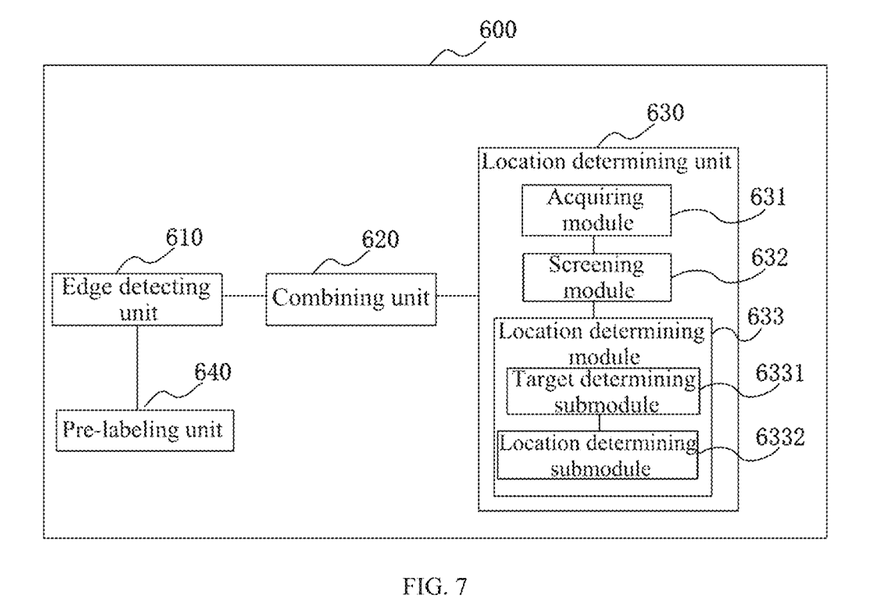
FIG. 7 is a structural diagram of an apparatus for determining a location of a signal light shown in another exemplary embodiment of the present application.

FIG. 7 is a structural diagram of an apparatus for determining a location of a signal light shown in another exemplary embodiment of the present application.

As shown in FIG. 7, on the basis of the above embodiment, the apparatus for determining the location of the signal light 600 provided by the present application, further includes: a pre-labeling unit 640, configured to label a location of a light frame of the signal light in a history image in advance;

where before determining the horizontal edges and the vertical edges in each of the images for the plurality of frames of images captured including the signal light, the edge detecting unit 610 is further configured to:

determine, according to the location of the light frame of the signal light, preset designated areas in the plurality of frames of images captured including the signal light;

the edge detecting unit 610 is specifically configured to:

determine the horizontal edge and the vertical edge in the preset designated area of each of the images.

The combining unit 620 is specifically configured to:

combine the horizontal edge and the vertical edge belonging to a same image to obtain the rectangular frame.

The location determining unit 630 includes:

an acquiring module 631, configured to acquire the preset size information of the frame of the signal light;

a screening module 632, configured to determine effective rectangular frames in the plurality of rectangular frames according to the preset size information of the frame of the signal light; and a location determining module 633, configured to determine, according to each of the effective rectangular frames, the location of the signal light in the image.

The preset size information of the frame of the signal light includes any two of following parameters: a height value, a width value and a height width ratio;

the screening module 632 is specifically configured to:

screen out an effective rectangular frame whose size meets any two parameters of the height value, the width value and the height width ratio in the preset size information of the frame of the signal light in the plurality of rectangular frames.

The location determining module 633 includes:

a target determining submodule 6331, configured to determine center points of the effective rectangular frames, and determine target rectangular frames in a plurality of effective rectangular frames according to the center points; and a location determining submodule 6332, configured to determine, according to the target rectangular frames, the location of the signal light in the image.

The target determining submodule 6331 is specifically configured to:

process the center points based on a random sample consensus algorithm to determine target center points;

determine effective rectangular frames corresponding to the target center points as the target rectangular frames.

The location determining submodule 6332 is specifically configured to:

determine an average location of the target rectangular frames to obtain the location of the signal light in the image.

The edge detecting unit 610 is specifically configured to:

perform edge detection on each of the images based on a Sobel operator to obtain the horizontal edges and the vertical edges in each of the images.

The pre-labeling unit 640 labels a location of a light frame of the signal light in a history image in advance;

the acquiring module 631 is specifically configured to:

determine the size information of the frame of the signal light according to the location of the light frame of the signal light.

In an optional implementation, the present application further provides a computer program product, including a computer program, which is stored in a readable storage medium, at least one processor of an electronic device can read the computer program from the readable storage medium, and at least one processor executes the computer program to cause the electronic device to execute the solution provided in any of the above embodiments.

The present application further provides a roadside device, including an electronic device as shown below.

According to an embodiment of the present application, an electronic device and a readable storage medium are further provided.

Figure 8:
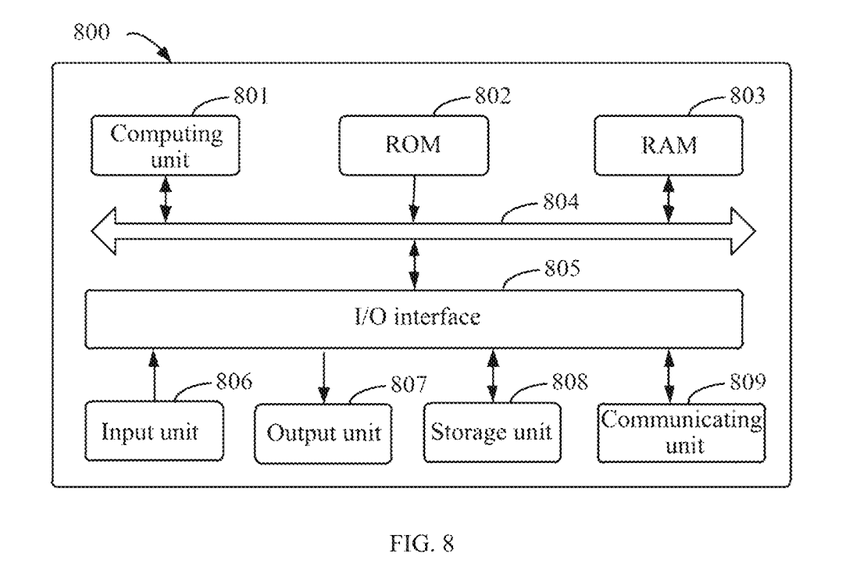
FIG. 8 is a block diagram of an electronic device for realizing a method for determining a location of a signal light in an embodiment of the present application.

FIG. 8 shows a schematic block diagram of an example electronic device 800 that can be used to implement an embodiment of the present application. The electronic device is intended to represent various forms of digital computers, such as a laptop computer, a desktop computer, a workstation, a personal digital assistant, a server, a blade server, a mainframe computer, and other suitable computers. The electronic device may also represent various forms of mobile apparatuses, such as a personal digital assistant, a cellular phone, a smart phone, a wearable device, and other similar computing apparatuses. Components shown herein, connections and relationships thereof, as well as functions thereof are merely examples and are not intended to limit implementations of the present application described and/or claimed herein.

As shown in FIG. 8, the electronic device 800 includes a computing unit 801 that may execute various appropriate actions and arrangements according to a computer program stored in read-only memory (ROM) 802 or a computer program loaded into random access memory (RAM) 803 from the storage unit 808. In the RAM 803, various programs and data needed for the operation of the device 800 can also be stored. The computing unit 801, ROM 802 and RAM 803 are connected to each other through a bus 804. An input/output (I/O) interface 805 is also connected to the bus 804.

A plurality of components in the device 800 are connected to the I/O interface 805, including: an input unit 806, such as a keyboard, a mouse, etc.; an output unit 807, such as various types of displays, loudspeakers, and the like; a storage unit 808, such as a magnetic disk, an optical disk, etc.; and a communicating unit 809, such as a network card, a modem, a wireless communication transceiver, and the like. The communicating unit 809 allows the device 800 to exchange information/data with other devices through a computer network such as Internet and/or various telecommunication networks.

The computing unit 801 may be a variety of general and/or special processing components with processing and computing capabilities. Some examples of the computing unit 801 include but are not limited to a central processing unit (CPU), a graphics processing unit (GPU), various dedicated artificial intelligence (AI) computing chips, various computing units running machine learning model algorithms, a digital signal processor (DSP), and any appropriate processor, controller, microcontroller, etc. The computing unit 801 performs various methods and processes described above, such as the method for determining the location of the signal light. For example, in some embodiments, the method for determining the location of the signal light may be implemented as a computer software program that is tangibly contained in a machine-readable medium, such as a storage unit 808. In some embodiments, some or all of the computer programs may be loaded and/or installed on device 800 via ROM 802 and/or communicating unit 809. When the computer program is loaded into the RAM 803 and executed by the computing unit 801, one or more steps of the method for determining the location of the signal light described above may be executed. Alternatively, in other embodiments, the computing unit 801 may be configured to perform the method for determining the location of the signal light by any other appropriate means (e.g., by means of firmware).

Various implementations of the systems and technologies described above herein can be implemented in a digital electronic circuit system, an integrated circuit system, a field programmable gate array (FPGA), an application specific integrated circuit (ASIC), an application specific standard product (ASSP), a system on chip (SOC), a complex programmable logic device (CPLD), computer hardware, firmware, software, and/or a combination thereof. These various embodiments may include: being implemented in one or more computer programs, the one or more computer programs may be executed and/or interpreted on a programmable system including at least one programmable processor, the programmable processor may be a dedicated or general programmable processor, and can receive data and instructions from a storage system, at least one input apparatus, and at least one output apparatus, and transmitting the data and instructions to the storage system, the at least one input apparatus, and the at least one output apparatus.

Program codes for implementing the method of the present disclosure may be written in any combination of one or more programming languages. These program codes may be provided to a processor or controller of a general computer, a dedicated computer, or other programmable data processing apparatus, so that when the program codes are executed by the processor or controller, the functions/operations specified in the flowchart and/or block diagram are implemented. The program codes can be executed entirely on a machine, partly executed on the machine, partly executed on the machine and partly executed on a remote machine as an independent software package, or entirely on the remote machine or server.

In the context of the present disclosure, a machine-readable medium may be a tangible medium that may contain or store programs for use by or in combination with an instruction execution system, apparatus or device. The machine-readable medium may be a machine-readable signal medium or a machine-readable storage medium. Machine-readable media may include, but are not limited to, electronic, magnetic, optical, electromagnetic, infrared, or semiconductor systems, apparatuses, or devices, or any suitable combination of the foregoing. More specific examples of machine-readable storage media may include one or more line based electrical connection, a portable computer disk, a hard disk, a random access memory (RAM), a read-only memory (ROM), an erasable programmable read-only memory (EPROM or flash memory), an optical fiber, a compact disk read-only memory (CD-ROM), an optical storage device, a magnetic storage device, or any suitable combination of the above.

In order to provide interaction with a user, the systems and technologies described herein may be implemented on a computer, where the computer has: a display apparatus (e.g., a CRT (cathode ray tube) or LCD (liquid crystal display) monitor) for displaying information to the user; and a keyboard and a pointing apparatus (e.g., a mouse or a trackball), through which the user can provide inputs to the computer. Other types of apparatuses may also be used to provide interaction with the user; for example, the feedback provided to the user may be any form of sensing feedback (for example, visual feedback, auditory feedback, or tactile feedback); and the input from the user may be received in any form (including acoustic input, voice input, tactile input).

The systems and technologies described here may be implemented in a computing system (e.g., a data server) including a back-end component, or in a computing system (e.g., an application server) including a middleware component, or in a computing system (e.g., a user computer having a graphical user interface or a web browser, through which the user can interact with the implementations of the systems and technologies described herein) including a front-end component, or in a computing system including any combination of the back-end component, the middleware component, or the front-end component. The components of the system may be interconnected via digital data communication (e.g., a communication network) in any form or medium. Examples of the communication network include: a local area network (LAN), a wide area network (WAN) and Internet.

A computer system may include a client and a server. The client and the server are generally located far away from each other and usually interact with each other through a communication network. A relationship between the client and the server is generated by computer programs running on corresponding computers and having a client-server relationship between each other.

The server can be a cloud server, also known as a cloud computing server or a cloud host. It is a host product in a cloud computing service system, which solves shortcomings of traditional physical host and VPS services ("Virtual Private Server", or "VPS") such as difficult management and weak business scalability. The server can also be a distributed system server or a server combined with blockchain.

It should be understood that steps can be reordered, added, or deleted by using the various forms of processes shown above. For example, the steps recited in the present application can be performed in parallel, in sequence or in different orders, as long as expected results of the technical solutions disclosed by the present application can be realized, and there is no limitation herein.

The above specific implementations do not limit the protection scope of the present application. It should be understood by those skilled in the art that various modifications, combinations, sub-combinations and substitutions may be made according to design requirements and other factors. Any modification, equivalent replacement and improvement made within the spirit and principle of the present application shall be included in the protection scope of the present application.

What is claimed is:

1. A method for determining a location of a signal light, comprising:
   for a plurality of frames of images captured comprising the signal light, determining horizontal edges and vertical edges in each of the images;
   combining the obtained horizontal edges and vertical edges to obtain a plurality of rectangular frames; and
   determining, according to the plurality of rectangular frames and preset size information of a frame of the signal light, the location of the signal light in the image;
   wherein the determining, according to the plurality of rectangular frames and preset size information of a frame of the signal light, the location of the signal light in the image comprises:

acquiring the preset size information of the frame of the signal light;

determining effective rectangular frames in the plurality of rectangular frames according to the preset size information of the frame of the signal light; and determining, according to the effective rectangular frames, the location of the signal light in the image;

wherein the determining, according to the effective rectangular frames, the location of the signal light in the image comprises:

determining center points of the effective rectangular frames, and determining target rectangular frames in a plurality of effective rectangular frames according to the center points; and determining, according to the target rectangular frames, the location of the signal light in the image, wherein the determining target rectangular frames in a plurality of effective rectangular frames according to the center points comprises:

processing the center points based on a random sample consensus (RANSAC) algorithm to determine target center points; and determining effective rectangular frames corresponding to the target center points as the target rectangular frames.

2. The method according to claim 1, wherein a location of a light frame of the signal light is labeled in a history image in advance;

before the determining horizontal edges and vertical edges in each of the images for a plurality of frames of images captured comprising the signal light, the method further comprises:

determining, according to the location of the light frame of the signal light, preset designated areas in the plurality of frames of images captured comprising the signal light;

the determining horizontal edges and vertical edges in each of the images comprises:

determining the horizontal edges and the vertical edges in the preset designated area of each of the images.

3. The method according to claim 1, wherein the combining the obtained horizontal edges and vertical edges to obtain a plurality of rectangular frames comprises:

combining the horizontal edges and the vertical edges belonging to a same image to obtain the rectangular frames.

4. The method according to claim 1, wherein the preset size information of the frame of the signal light comprises any two of following parameters: a height value, a width value and a height width ratio;

the determining effective rectangular frames in the plurality of rectangular frames according to the preset size information of the frame of the signal light comprises:

screening out an effective rectangular frame whose size meets any two parameters of the height value, the width value and the height width ratio in the preset size information of the frame of the signal light in the plurality of rectangular frames.

5. The method according to claim 1, wherein the determining, according to the target rectangular frames, the location of the signal light in the image comprises:

determining an average location of the target rectangular frames to obtain the location of the signal light in the image.

6. The method according to claim 1, wherein the determining horizontal edges and vertical edges in each of the images comprises:

performing edge detection on each of the images based on a Sobel operator to obtain the horizontal edges and the vertical edges in each of the images.

7. The method according to claim 1, wherein a location of a light frame of the signal light is labeled in a history image in advance;

the acquiring the preset size information of the frame of the signal light comprises:

determining the preset size information of the frame of the signal light according to the location of the light frame of the signal light.

8. An apparatus for determining a location of a signal light, comprising:

at least one processor; and a memory, in communicational connection with the at least one processor; wherein, the memory stores instructions executable by the at least one processor, and the instructions are executed by the at least one processor, so that the at least one processor is configured to:

for a plurality of frames of images captured comprising the signal light, determine horizontal edges and vertical edges in each of the images;

combine the obtained horizontal edges and vertical edges to obtain a plurality of rectangular frames; and determine, according to the plurality of rectangular frames and preset size information of a frame of the signal light, the location of the signal light in the image;

wherein the at least one processor is further configured to:

acquire the preset size information of the frame of the signal light;

determine effective rectangular frames in the plurality of rectangular frames according to the preset size information of the frame of the signal light; and determine, according to the effective rectangular frames, the location of the signal light in the image;

wherein the at least one processor is configured to:

determine center points of the effective rectangular frames, and determine target rectangular frames in a plurality of effective rectangular frames according to the center points; and determine, according to the target rectangular frames, the location of the signal light in the image, wherein the at least one processor is configured to:

process the center points based on a random sample consensus (RANSAC) algorithm to determine target center points; and determine effective rectangular frames corresponding to the target center points as the target rectangular frames.

9. The apparatus according to claim 8, further comprising:

the at least one processor is configured to label a location of a light frame of the signal light in a history image in advance;

wherein before determining the horizontal edges and the vertical edges in each of the images for the plurality of frames of images captured comprising the signal light, the at least one processor is further configured to:

determine, according to the location of the light frame of the signal light, preset designated areas in the plurality of frames of images captured comprising the signal light; and determine the horizontal edge and the vertical edge in the preset designated area of each of the images.

10. The apparatus according to claim 8, wherein the at least one processor is configured to:

combine the horizontal edges and the vertical edges belonging to a same image to obtain the rectangular frames.

11. The apparatus according to claim 8, wherein the preset size information of the frame of the signal light comprises any two of following parameters: a height value, a width value and a height width ratio;

the at least one processor is configured to:

screen out an effective rectangular frame whose size meets any two parameters of the height value, the width value and the height width ratio in the preset size information of the frame of the signal light in the plurality of rectangular frames.

12. The apparatus according to claim 8, wherein the at least one processor is configured to:

perform edge detection on each of the images based on a Sobel operator to obtain the horizontal edges and the vertical edges in each of the images.

13. The apparatus according to claim 8, wherein the at least one processor labels a location of a light frame of the signal light in a history image in advance;

the at least one processor is configured to:

determine the size information of the frame of the signal light according to the location of the light frame of the signal light.

14. A non-transitory computer-readable storage medium storing computer instructions, wherein the computer instructions are used to cause a computer to execute the method according to claim 1.

15. A roadside device, comprising the apparatus according to claim 8.

* * * * *